(12) United States Patent
Kanno

(10) Patent No.: US 11,372,161 B2
(45) Date of Patent: Jun. 28, 2022

(54) METHOD OF MANUFACTURING OPTICAL FIBER ASSEMBLY

(71) Applicant: FUJIKURA LTD., Tokyo (JP)

(72) Inventor: Shuhei Kanno, Sakura (JP)

(73) Assignee: FUJIKURA LTD., Tokyo (JP)

( * ) Notice: Subject to any disclaimer, the term of this patent is extended or adjusted under 35 U.S.C. 154(b) by 327 days.

(21) Appl. No.: 16/651,808

(22) PCT Filed: Oct. 23, 2018

(86) PCT No.: PCT/JP2018/039263
§ 371 (c)(1),
(2) Date: Mar. 27, 2020

(87) PCT Pub. No.: WO2019/130761
PCT Pub. Date: Jul. 4, 2019

(65) Prior Publication Data
US 2020/0249390 A1    Aug. 6, 2020

(30) Foreign Application Priority Data

Dec. 25, 2017   (JP) .............................. JP2017-247579

(51) Int. Cl.
*G02B 6/25*    (2006.01)
*G02B 6/36*    (2006.01)
(Continued)

(52) U.S. Cl.
CPC .............. *G02B 6/25* (2013.01); *G02B 6/3644* (2013.01); *G02B 6/381* (2013.01); *G02B 6/3833* (2013.01);
(Continued)

(58) Field of Classification Search
None
See application file for complete search history.

(56) References Cited

U.S. PATENT DOCUMENTS

| 5,046,813 A | 9/1991 | Itoh et al. |
| 10,444,435 B2 * | 10/2019 | Burek ................. G02B 6/4403 |

(Continued)

FOREIGN PATENT DOCUMENTS

| CN | 105988160 A | 10/2016 |
| JP | S61209404 A | 9/1986 |

(Continued)

*Primary Examiner* — Michelle R Connelly
(74) *Attorney, Agent, or Firm* — Osha Bergman Watanabe & Burton LLP

(57) ABSTRACT

A method of manufacturing an optical fiber assembly into which optical fibers are integrated includes: preparing an alignment member having through holes with a pitch that is greater than a coating diameter of the optical fibers; inserting each of the optical fibers into one of the through holes; after the inserting of the optical fibers into the through holes, holding the optical fibers on both sides of the alignment member by a pair of grippers; after the inserting of the optical fibers into the through holes, connecting at least adjacent ones of the optical fibers by disposing an adhesive material on at least one side of the alignment member; and forming an optical fiber assembly by curing the adhesive material in a state in which the optical fibers held by the grippers are stretched along an optical axis.

4 Claims, 6 Drawing Sheets

(51) Int. Cl.
*G02B 6/38* (2006.01)
*G02B 6/44* (2006.01)
*F21V 8/00* (2006.01)

(52) U.S. Cl.
CPC ......... *G02B 6/3861* (2013.01); *G02B 6/3885* (2013.01); *G02B 6/0065* (2013.01); *G02B 6/448* (2013.01)

(56) References Cited

U.S. PATENT DOCUMENTS

2005/0271342 A1* 12/2005 Tanaka .................. G02B 6/448
385/134
2008/0187276 A1  8/2008 Roberts et al.
2019/0369344 A1* 12/2019 Schiller ................ G02B 6/3833

FOREIGN PATENT DOCUMENTS

| JP | H02072306 A | 3/1990 | |
|---|---|---|---|
| JP | H08122577 A | 5/1996 | |
| JP | H09203818 A | 8/1997 | |
| JP | H110153723 A | 6/1998 | |
| JP | 3794539 B2 * | 7/2006 | ............. G02B 6/448 |

* cited by examiner

METHOD OF MANUFACTURING OPTICAL FIBER ASSEMBLY

This is a U.S. National Stage application of International Application No. PCT/JP2018/039263 filed Oct. 23, 2018, which claims benefit of priority from Japanese patent application No. 2017-247579 filed on Dec. 25, 2017. These references are incorporated herein by reference in their entirety.

TECHNICAL FIELD

The present invention relates to a method of manufacturing an optical fiber assembly, and more particularly to a method of manufacturing an optical fiber assembly into which a plurality of optical fibers are integrated.

BACKGROUND

For example, a Mechanically Transferable (MT) connector has been known as an optical connector for connecting a multi-fiber assembly such as a multi-fiber ribbon (see, e.g., Patent Literature 1). Such an MT connector includes a ferrule having insertion holes formed with a predetermined pitch for allowing optical fibers to be inserted therein. In order to insert a plurality of optical fibers into such insertion holes of an MT ferrule, those optical fibers need to be aligned so as to accord with the pitch of the insertion holes (fiber arrangement). In most of past cases, the diameter of coatings of optical fibers connected to an MT ferrule has been equal to the pitch of insertion holes (e.g., 250 μm). Therefore, when a plurality of coated optical fibers are simply placed closely to each other, those optical fibers can relatively easily be aligned so as to accord with a pitch of insertion holes in an MT ferrule.

In recent years, optical fibers having a small diameter (e.g., 80 μm) have been used in some cases for reducing the size of a fiber ribbon. The diameter of coatings of such optical fibers (e.g., 160 μm) does not accord with the pitch of insertion holes of existing MT ferrules (e.g., 250 μm). Therefore, even if coated optical fibers are placed closely to each other, those optical fibers cannot be aligned so as to accord with the pitch of insertion holes of an MT ferrule. Accordingly, in order to maintain compatibility with existing MT connectors, an exposed end of each of optical fibers needs to be inserted into and fixed to an insertion hole of an MT ferrule one by one. Such an insertion operation is very troublesome and time-consuming. Therefore, there has been demanded a technique that allows small-diameter optical fibers to be aligned and integrated so as to accord with a pitch of insertion holes in an existing MT ferrule.

One or more embodiments of the present invention provide a method capable of readily manufacturing an optical fiber assembly into which a plurality of optical fibers have been integrated with a predetermined pitch.

PATENT LITERATURE

Patent Literature 1: JP 10-153723 A

SUMMARY

According to one or more embodiments of the present invention, there is provided a method capable of readily manufacturing an optical fiber assembly into which a plurality of optical fibers have been integrated with a predetermined pitch. In this method, an alignment member having a plurality of through holes arranged with a pitch that is greater than a coating diameter of the optical fibers is prepared. Each of the plurality of optical fibers is inserted into one of the through holes of the alignment member. After the inserting of the optical fibers into the through holes, the plurality of optical fibers are held on both sides of the alignment member by a pair of grippers. After the inserting of the optical fibers into the through holes, an adhesive material is formed on at least one side of the alignment member such that at least adjacent optical fibers of the plurality of optical fibers are connected to each other. The adhesive material is cured in a state in which the plurality of optical fibers held by the grippers are stretched along an optical axis, to form an optical fiber assembly.

According to the above method, a plurality of optical fibers can be integrated with use of an alignment member in a state in which the optical fibers are aligned at equal intervals with a predetermined pitch. Therefore, an optical fiber assembly into which a plurality of optical fibers have been aligned and integrated with a predetermined pitch can remarkably readily be manufactured. Furthermore, since the adhesive material is cured in a state in which the optical fibers have been stretched along the optical axis between the pair of grippers, the optical fibers are prevented from being loosened during the curing process of the adhesive material. Therefore, the optical fibers are prevented from being integrated while the pitch between the optical fibers partially varies along the optical axis.

When the optical fibers are held, the alignment member may be arranged near one gripper of the pair of grippers. After the optical fibers are held by the one gripper, the alignment member may be moved from a vicinity of the one gripper toward another gripper of the pair of grippers. The optical fibers are securely aligned with the predetermined pitch near the alignment member. Therefore, when the alignment member is located near one of the grippers, this gripper can hold a plurality of optical fibers in a state in which the optical fibers are aligned with the predetermined pitch. When the alignment member is moved toward the other gripper, a portion where the optical fibers are aligned with the predetermined pitch can be expanded from one of the grippers toward the other gripper. Accordingly, a plurality of optical fibers can be aligned in a wide range.

In view of less influence on the optical fibers by heating, a UV curable resin may be used as the adhesive material and an ultraviolet ray may be applied to the adhesive material during the curing process of the adhesive material.

According to the present invention, a plurality of optical fibers can be integrated with use of an alignment member in a state in which the optical fibers are aligned at equal intervals with a predetermined pitch. Therefore, an optical fiber assembly into which a plurality of optical fibers have been aligned and integrated with a predetermined pitch can remarkably readily be manufactured.

DETAILED DESCRIPTION

Figure 1:
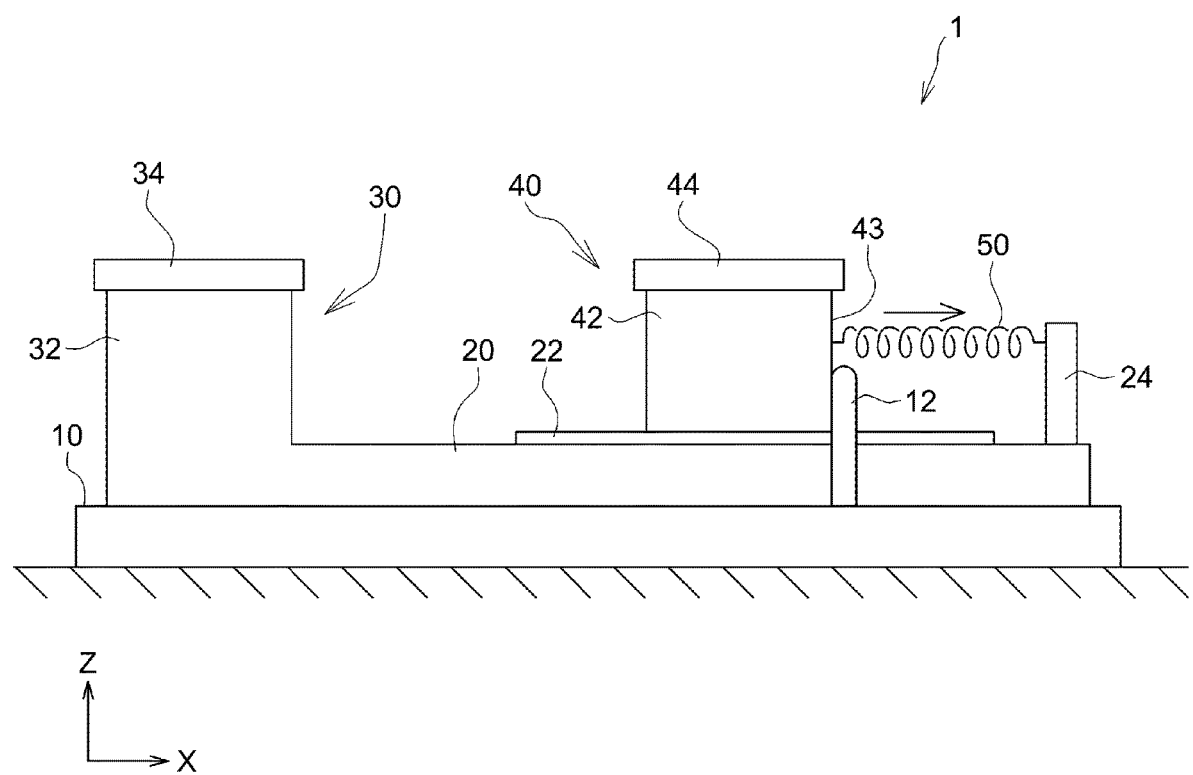
FIG. 1 is a front view schematically showing an optical fiber assembly production apparatus according to one or more embodiments of the present invention.

Embodiments of a method of manufacturing an optical fiber assembly according to the present invention will be described in detail below with reference to FIGS. 1 to 2E. In FIGS. 1 to 2E, the same or corresponding components are denoted by the same or corresponding reference numerals and will not be described below repetitively. Furthermore, in FIGS. 1 to 2E, the scales or dimensions of components may be exaggerated, or some components may be omitted.

FIG. 1 is a front view schematically showing an optical fiber assembly production apparatus 1 according to one or more embodiments of the present invention. For example, a method of manufacturing an optical fiber assembly according to the present invention can be carried out by using the optical fiber assembly production apparatus 1 illustrated in FIG. 1. The optical fiber assembly production apparatus 1 illustrated in FIG. 1 has a base member 10, a plate member 20 placed on the base member 10, a stationary clamp (gripper) 30 provided so as to project upward (in +Z-direction) from the plate member 20, and a movable clamp (gripper) 40 that is movable in a horizontal direction (X-direction) on rails 22 provided on the plate member 20.

The stationary clamp 30 includes a mounting block 32 on which optical fibers are to be placed and a cover 34 that can be rotated with respect to the mounting block 32 for opening and closing operations. The cover 34 can be rotated from a state in which the cover 34 stands up in the vertical direction to a state shown in FIG. 1, in which the cover 34 lies in the horizontal direction. For example, this cover 34 can maintain the closed state shown in FIG. 1 with magnetic forces of magnets embedded in the mounting block 32 and the cover 34, respectively.

Similarly, the movable clamp 40 includes a mounting block 42 on which optical fiber are to be placed and a cover 44 that can be rotated with respect to the mounting block 42 for opening and closing operations. The cover 44 can be rotated from a state in which the cover 44 stands up in the vertical direction to a state shown in FIG. 1, in which the cover 44 lies in the horizontal direction. For example, this cover 44 can maintain the closed state shown in FIG. 1 with magnetic forces of magnets embedded in the mounting block 42 and the cover 44, respectively.

As shown in FIG. 1, a spring support portion 24 extending along the Z-direction is provided on an end of the plate member 20 at the +X side. The coil spring 50 extends under tension between the spring support portion 24 and the mounting block 42 of the movable clamp 40. Specifically, the coil spring 50 has an end fixed to the spring support portion 24 and another end fixed to the mounting block 42 of the movable clamp 40. In FIG. 1, the coil spring 50 is stretched from its natural length, so that the coil spring 50 applies a force to the movable clamp 40 toward the +X-direction. However, a side surface 43 of the mounting block 42 of the movable clamp 40 abuts a stopper 12 provided on the base member 10. Accordingly, the movable clamp 40 does not move toward the +X-direction.

The plate member 20 can be lifted and detached from the base member 10. The stopper 12 of the base member 10 can be disengaged from the side surface 43 of the mounting block 42 of the movable clamp 40 by detachment of the plate member 20 from the base member 10 as described later. Thus, the restriction on the movable clamp 40 is removed in the +X-direction, so that the movable clamp 40 moves on the rails 22 toward the +X-direction by an urging force of the coil spring 50.

Now a method of manufacturing an optical fiber assembly with use of such an optical fiber assembly production apparatus 1 will be described with reference to FIGS. 2A to 2E.

Figure 2A:
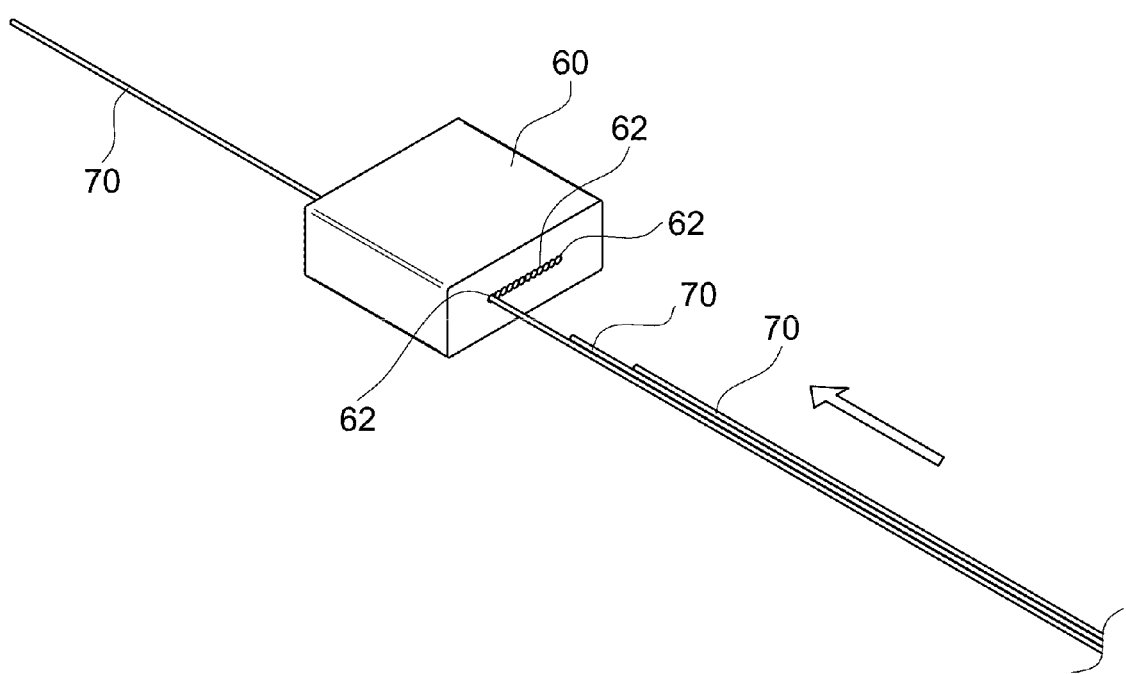
FIG. 2A is a schematic diagram explanatory of a method of manufacturing an optical fiber assembly according to one or more embodiments of the present invention.

In a method of manufacturing an optical fiber assembly according to the present invention, an alignment member 60 as shown in FIG. 2A is used. This alignment member 60 has a plurality of through holes 62 arranged in a row. The distance between centers of adjacent through holes 62 (pitch) is designed so as to be equal to a pitch of insertion holes of an existing MT ferrule. For example, this distance is 250 μm. The pitch of the through holes 62 is greater than an outside diameter (coating diameter) of a coating of each of the optical fibers 70, which form an optical fiber assembly. For example, optical fibers having a fiber diameter of 80 μm and a coating diameter of 160 μm may be used as the optical fibers 70, which form an optical fiber assembly. For example, the length of the alignment member 60 as measured along an optical axis is 8 mm.

First, as shown in FIG. 2A, each of the optical fibers 70 is introduced into one side of the through hole 62 of the alignment member 60 and inserted into the through hole 62 until the optical fiber 70 projects from the other side of the through hole 62. Thus, a plurality of optical fibers 70 are inserted into the through holes 62 of the alignment member 60, so that the optical fibers 70 are arranged in a row and aligned with a predetermined pitch (250 μm).

Figure 2B:
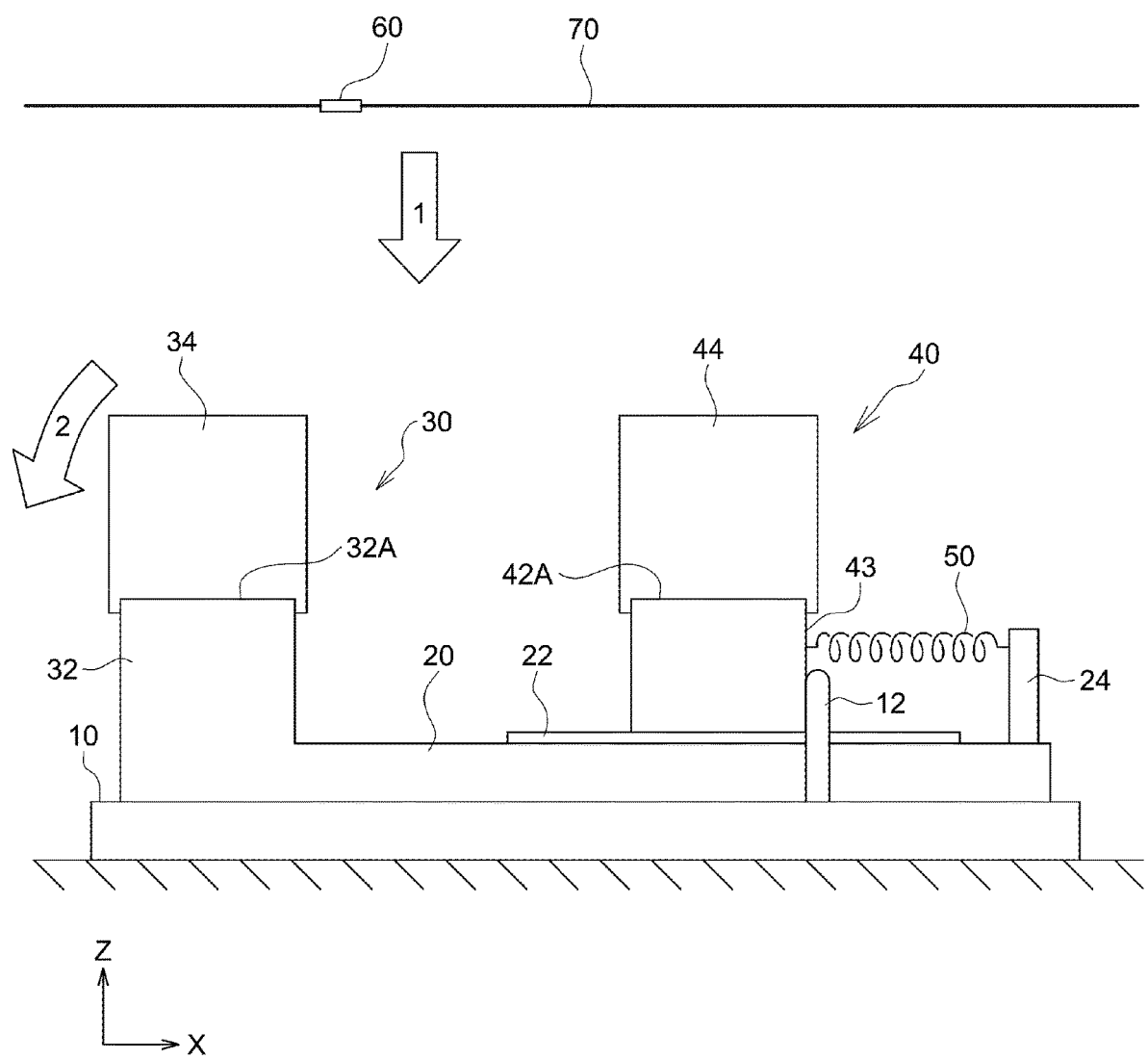
FIG. 2B is a schematic diagram explanatory of a method of manufacturing an optical fiber assembly according to one or more embodiments of the present invention.

Then, as shown in FIG. 2B, those optical fibers 70 are moved such that the alignment member 60 is located above the optical fiber assembly production apparatus 1. In a state shown in FIG. 2B, each of the cover 34 of the stationary clamp 30 and the cover 44 of the movable clamp 40 of the optical fiber assembly production apparatus 1 stands up in the vertical direction. Thus, upper surfaces 32A and 42A of the mounting blocks 32 and 42 are externally exposed. Although the coil spring 50 is stretched from its natural length, the side surface 43 of the mounting block 42 of the movable clamp 40 abuts the stopper 12 of the base member 10 to prevent the movable clamp 40 from moving in the +X-direction. For example, the distance between the stationary clamp 30 and the movable clamp 40 at that time is 10 cm.

The optical fibers 70 are placed on the mounting block 32 of the stationary clamp 30 and on the mounting block 42 of the movable clamp 40 (arrow 1 in FIG. 2B). At that time, the alignment member 60 is positioned between the stationary clamp 30 and the movable clamp 40 and near the stationary clamp 30. After the optical fiber 70 is placed on the mounting blocks 32 and 42, the cover 34 of the stationary clamp 30 is rotated into a closed position (arrow 2 in FIG. 2B). Thus, the optical fibers 70 are held on one side of the alignment member 60 (on the left side in FIG. 2B) by the stationary clamp 30.

Figure 2C:
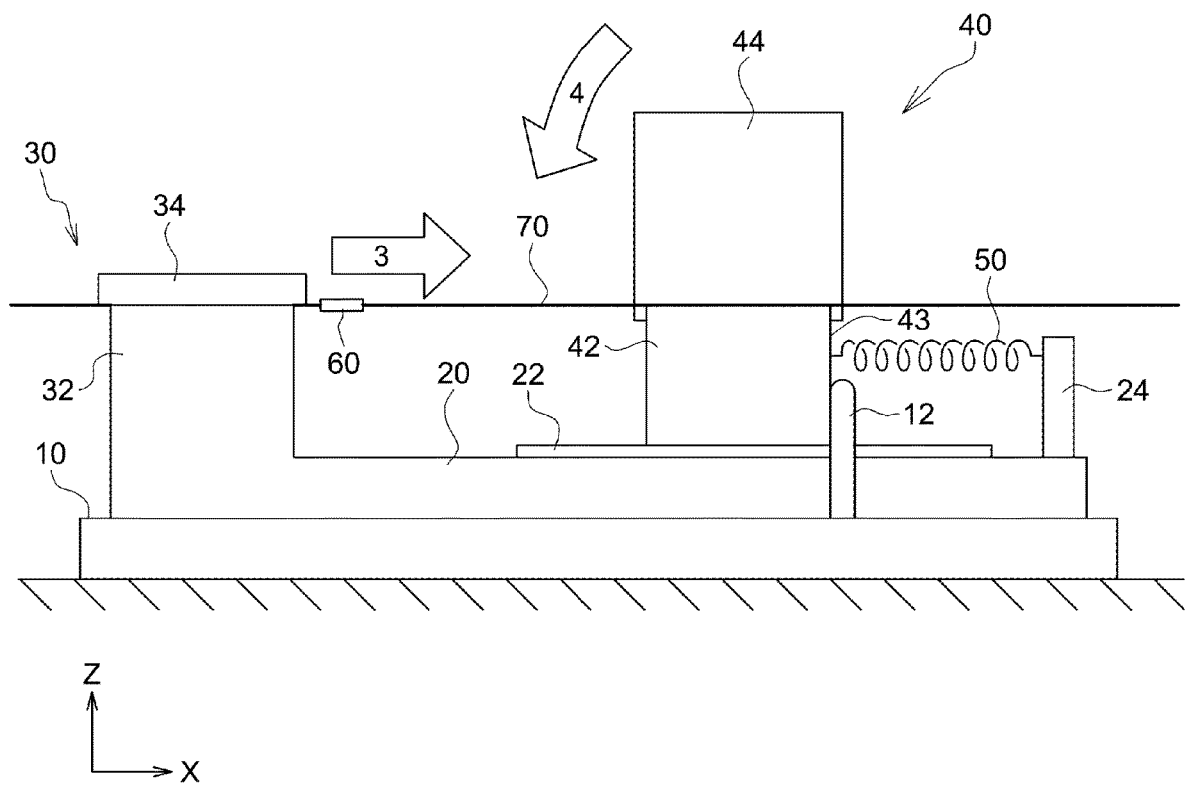
FIG. 2C is a schematic diagram explanatory of a method of manufacturing an optical fiber assembly according to one or more embodiments of the present invention.

Next, as shown in FIG. 2C, the alignment member 60 is moved from the vicinity of the stationary clamp 30 toward the movable clamp 40 (arrow 3 in FIG. 2C). As described above, a plurality of optical fibers 70 are securely aligned with the predetermined pitch near the alignment member 60.

Therefore, when the alignment member 60 is located near the stationary clamp 30, the stationary clamp 30 can hold a plurality of optical fibers 70 in a state in which the optical fibers 70 are aligned with the predetermined pitch. Thereafter, as described above, the alignment member 60 is moved toward the movable clamp 40, so that a portion where the optical fibers 70 are aligned with the predetermined pitch can be expanded from the stationary clamp 30 toward the movable clamp 40. Accordingly, a plurality of optical fibers 70 can be aligned in a wide range.

Then the cover 44 of the movable clamp 40 is rotated into a closed state (arrow 4 of FIG. 2C). Thus, the optical fibers 70 are held on the other side of the alignment member 60 (on the right side in FIG. 2B) by the movable clamp 40.

Figure 2D:
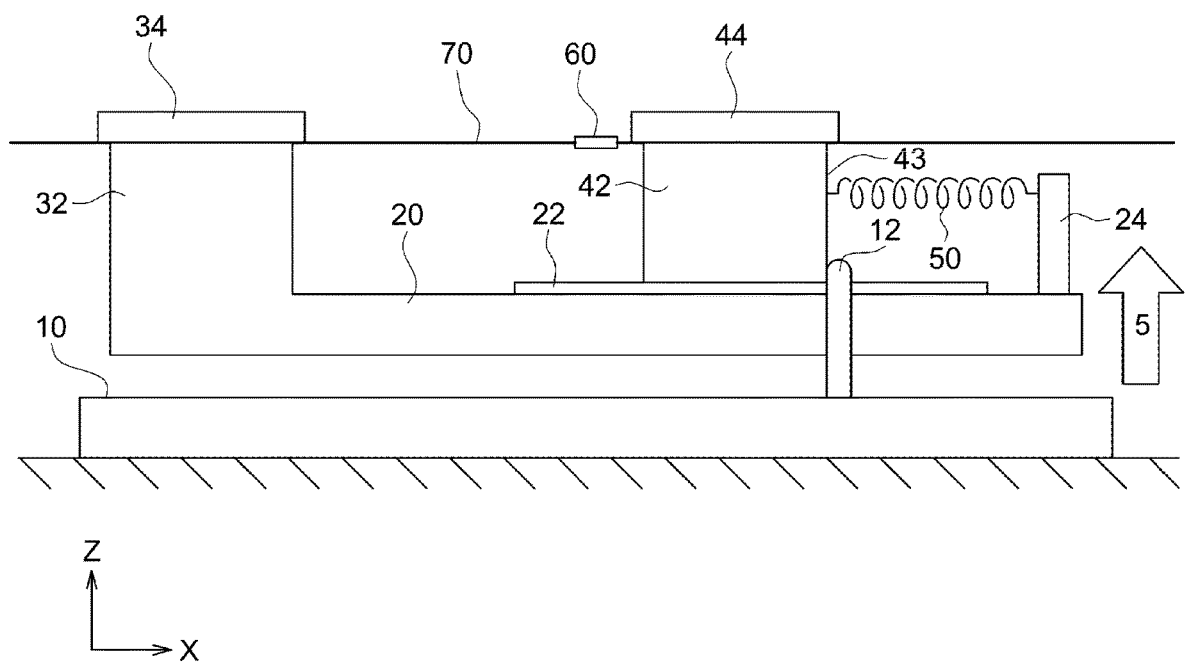
FIG. 2D is a schematic diagram explanatory of a method of manufacturing an optical fiber assembly according to one or more embodiments of the present invention.
Figure 2E:
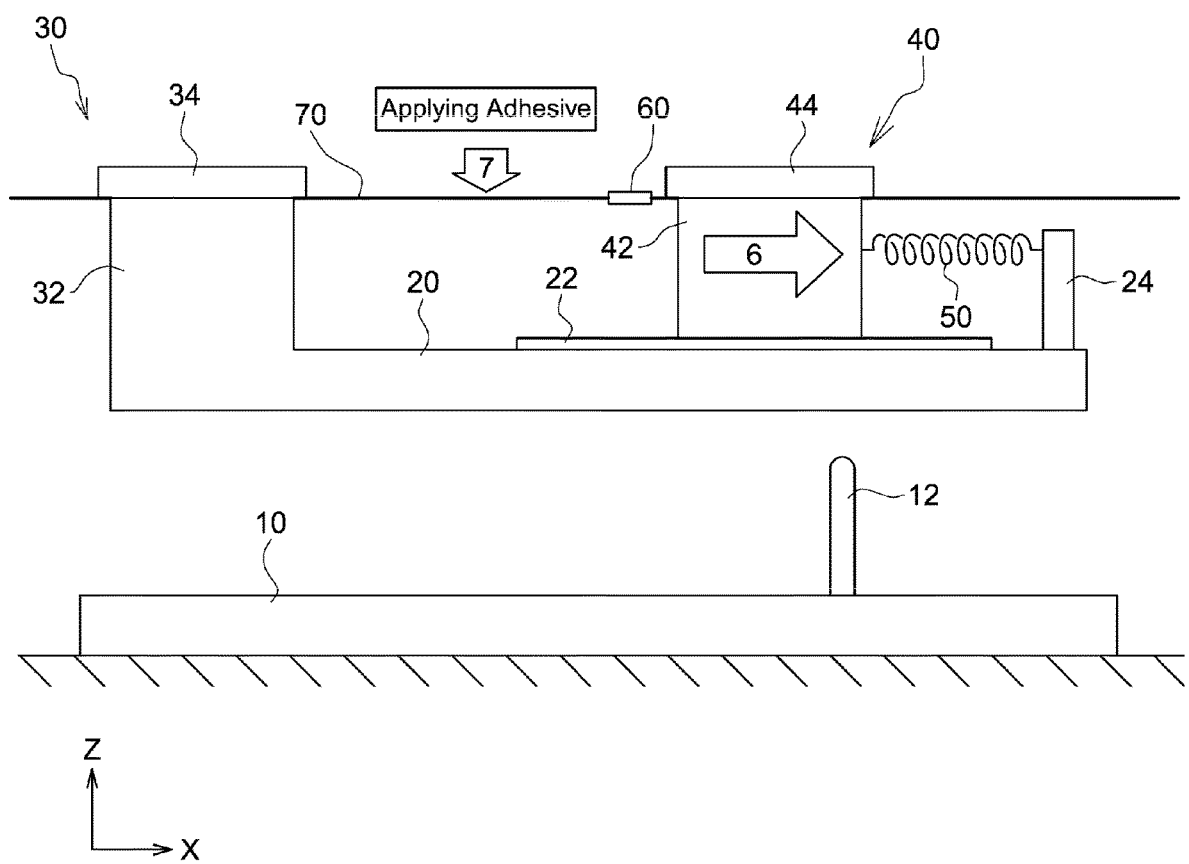
FIG. 2E is a schematic diagram explanatory of a method of manufacturing an optical fiber assembly according to one or more embodiments of the present invention.

In this state, as shown in FIG. 2D, the plate member 20 is lifted from the base member 10 (arrow 5 in FIG. 2D). When the stopper 12 of the base member 10 leave the side surface 43 of the mounting block 42 of the movable clamp 40, the restriction on the movable clamp 40 is removed in the +X-direction, so that the movable clamp 40 moves on the rails 22 toward the +X-direction by an urging force of the coil spring 50 (arrow 6 in FIG. 2E). Thus, the optical fibers 70 are stretched in the +X-direction (along the optical axis) between the stationary clamp 30 and the movable clamp 40.

In a state in which the optical fibers 70 have thus been stretched in the +X-direction between the stationary clamp 30 and the movable clamp 40, an adhesive material is applied to a portion of the optical fibers 70 between the stationary clamp 30 and the movable clamp 40 (arrow 7 in FIG. 2E). At that time, the adhesive material is formed such that the adhesive material is filled into at least gaps formed between adjacent optical fibers 70, i.e., such that the optical fibers 70 are connected to each other by the adhesive material. For example, a UV curable resin or a thermosetting resin may be used for the adhesive material.

Then the adhesive material is cured in the state in which the optical fibers 70 have been stretched in the +X-direction between the stationary clamp 30 and the movable clamp 40. Specifically, if a UV curable resin is used as the adhesive material, ultraviolet rays are applied to a portion where the adhesive material has been applied. If a thermosetting resin is used as the adhesive material, the portion where the adhesive material has been applied is heated. In view of less influence on the optical fibers 70 by heating, a UV curable resin may be used as the adhesive material.

Thus, the adhesive material is cured to integrate a plurality of optical fibers 70 aligned with the predetermined pitch. Therefore, even if the holding by the stationary clamp 30 and the movable clamp 40 is released, a plurality of optical fibers 70 can be maintained to be aligned with the predetermined pitch. In this manner, according to one or more embodiments, an optical fiber assembly into which a plurality of optical fibers 70 have been aligned and integrated with a predetermined pitch can remarkably readily be manufactured.

Furthermore, since the adhesive material is cured in a state in which the optical fibers 70 have been stretched in the +X-direction between the stationary clamp 30 and the movable clamp 40, the optical fibers 70 are prevented from being loosened during the curing process of the adhesive material. Therefore, the optical fibers 70 are prevented from being integrated while the pitch between the optical fibers 70 partially varies along the optical axis.

In the aforementioned embodiments, the adhesive material is applied to the optical fibers 70 after the alignment member 60 located near the stationary clamp 30 has been moved toward the movable clamp 40. Nevertheless, the adhesive material may be applied at any time after the optical fibers 70 have been inserted into the through holes 62 of the alignment member 60. In view of the workability of application of the adhesive material, the adhesive material may be applied after the optical fibers 70 have been held by the stationary clamp 30 and the movable clamp 40. Furthermore, if the alignment member 60 is not moved after the optical fibers 70 have been held by the stationary clamp 30, the adhesive material may be applied to a portion of the optical fibers 70 located on at least one side of the alignment member 60.

If movement of the movable clamp 40 due to the urging force of the coil spring 50 is not restricted by the stopper 12 upon application of the adhesive material, an operator needs to hold the movable clamp 40 with one hand and apply the adhesive material with the other hand. Thus, the operation is difficult to be performed by one person. However, in the aforementioned embodiments, since movement of the movable clamp 40 due to the urging force of the coil spring 50 is restricted by the stopper 12, an operator does not need to hold the movable clamp 40. Therefore, the operator can apply the adhesive material with both hands. Accordingly, even one person can manufacture an optical fiber assembly.

The present invention may be used for an optical fiber assembly into which a plurality of optical fibers have been integrated.

Although the disclosure has been described with respect to only a limited number of embodiments, those skilled in the art, having benefit of this disclosure, will appreciate that various other embodiments may be devised without departing from the scope of the present invention. Accordingly, the scope of the invention should be limited only by the attached claims.

REFERENCE SIGNS LIST

1 Optical fiber assembly production apparatus
10 Base member
12 Stopper
20 Plate member
22 Rail
24 Spring support portion
30 Stationary clamp
32 Mounting block
34 Cover
40 Movable clamp
42 Mounting block
43 Side surface
44 Cover
50 Coil spring
60 Alignment member
62 Through hole
70 Optical fiber

The invention claimed is:

1. A method of manufacturing an optical fiber assembly into which optical fibers are integrated, the method comprising:
preparing an alignment member having through holes with a pitch that is greater than a coating diameter of the optical fibers;
inserting each of the optical fibers into one of the through holes;
after the inserting of the optical fibers into the through holes, holding the optical fibers on both sides of the alignment member by a pair of grippers;
after the inserting of the optical fibers into the through holes, connecting at least adjacent ones of the optical fibers by disposing an adhesive material on at least one side of the alignment member; and forming an optical fiber assembly by curing the adhesive material in a state in which the optical fibers held by the grippers are stretched along an optical axis.

2. The method of manufacturing an optical fiber assembly according to claim 1, wherein the holding of the optical fibers comprises:

disposing the alignment member near a first gripper of the pair of grippers;

holding the optical fibers by the first gripper after disposing the alignment member; and after holding the optical fibers by the first gripper, moving the alignment member from a vicinity of the first gripper toward a second gripper of the pair of grippers.

3. The method of manufacturing an optical fiber assembly according to claim 2, wherein the adhesive material is a UV curable resin, and the curing of the adhesive material comprises applying an ultraviolet ray to the adhesive material.

4. The method of manufacturing an optical fiber assembly according to claim 1, wherein the adhesive material is a UV curable resin, and the curing of the adhesive material comprises applying an ultraviolet ray to the adhesive material.

* * * * *